Aug. 31, 1937.   E. W. GLACY   2,091,586
COASTER BRAKE
Filed April 21, 1936   2 Sheets-Sheet 1

INVENTOR:
EDWARD W. GLACY,
BY Gales P. Moore
HIS ATTORNEY

Aug. 31, 1937.　　　　E. W. GLACY　　　　2,091,586
COASTER BRAKE
Filed April 21, 1936　　　2 Sheets-Sheet 2

INVENTOR:
EDWARD. W. GLACY,
BY Gales P. Moore
HIS ATTORNEY.

Patented Aug. 31, 1937

2,091,586

UNITED STATES PATENT OFFICE 2,091,586

COASTER BRAKE

Edward W. Glacy, Bristol, Conn., assignor to General Motors Corporation, Detroit, Mich., a corporation of Delaware Application April 21, 1936, Serial No. 75,598

26 Claims. (Cl. 192—6)

This invention relates to coaster brakes and comprises all of the features of novelty herein disclosed. An object of the invention is to improve coaster brakes as by preventing the brake members from dragging or frictionally retarding the rotating parts during coasting or driving. Another object is to provide a cartridge mounting for coaster brakes whereby the brake mechanism and its housing are detachable as a unit from a bicycle crank hanger. Other objects are to improve coaster brakes whether mounted in hubs or in crank hangers.

To these ends and also to improve generally upon devices of this character, the invention consists in the various matters hereinafter described and claimed. In its broader aspects, the invention is not necessarily limited to the specific constructions selected for illustrative purposes in the accompanying drawings in which Fig. 1 is an axial sectional view.

Figure 1:
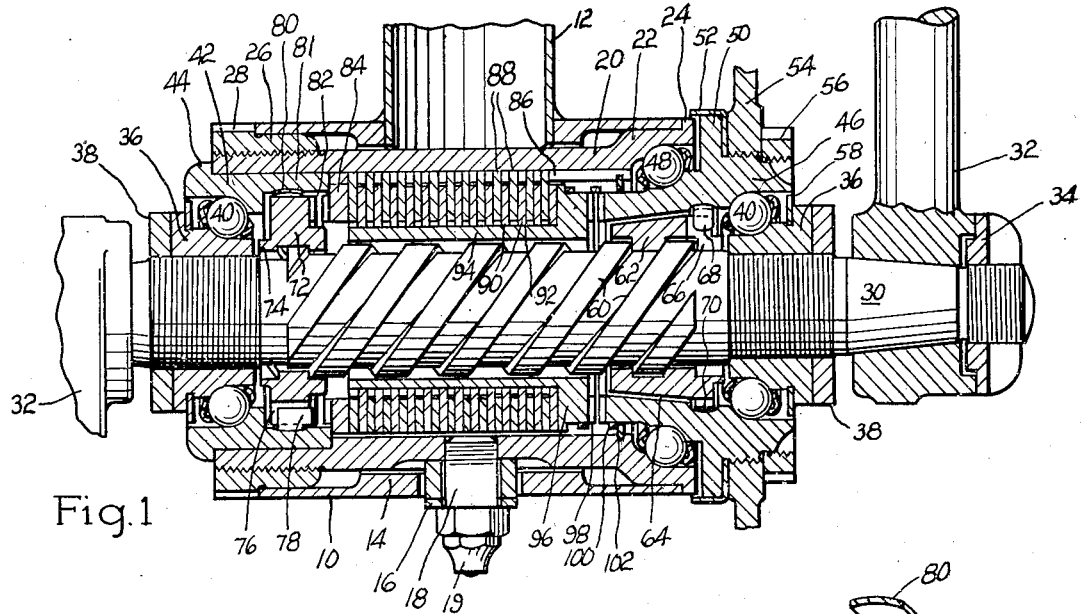
Figure 2:
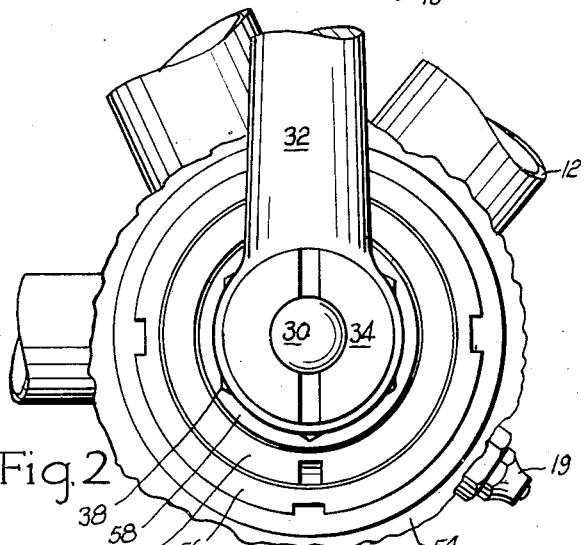
Fig. 2 is a side elevation.
Figure 4:
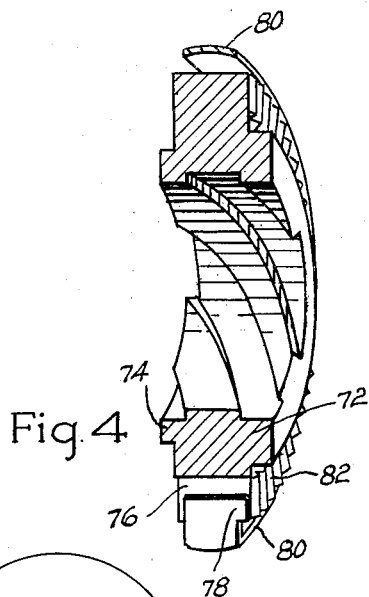
Fig. 4 is a broken away and enlarged perspective view of a nut and lag spring.
Figure 3:
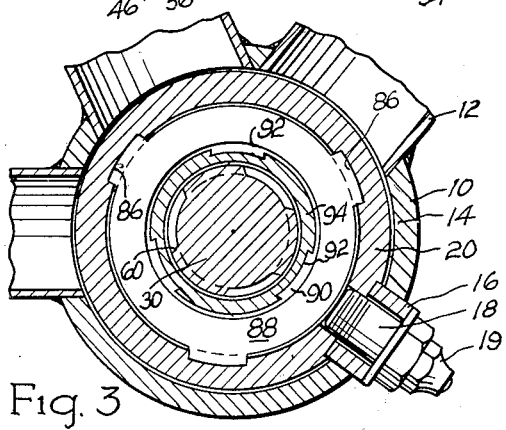
Fig. 3 is a cross section taken centrally of Fig. 1.
Figure 5:
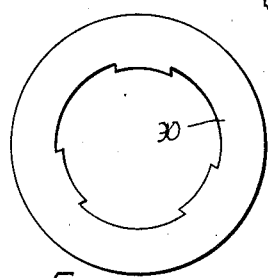
Fig. 5 is a side view of one of the inner brake discs.

The numeral 10 indicates the usual bicycle crank hanger into which the improved coaster brake and pedal shaft are assembled as a detachable unit. The usual tubular frame members 12 project into the hanger which has its central portion 14 thickened somewhat to strengthen it. The hanger is slotted to receive a tubular key 16 and a hollow securing screw 18, the latter being provided with a grease fitting 19. The key passes through a slot or keyway in a brake housing 20 to prevent the latter from turning and the hollow securing screw 18 is threaded into a tapped hole in the housing to furnish communication between the grease fitting and the interior of the brake housing. The housing has an enlargement 22 near one end to seat in the hanger and a flange 24 to engage one end of the hanger. At the other end, the housing is threaded to receive a nut 26 which is seated in the hanger and has a flange 28 to abut against the adjacent end of the hanger thereby detachably clamping the brake housing to the hanger.

A crank or pedal shaft 30 passes through the housing, its ends being provided with tapered and non-circular portions to receive pedal arms 32 which are detachably secured by nuts 34. Threaded inner race rings or bearing cones 36 are threaded on the shaft and clamped in adjusted positions by lock nuts 38. Rolling elements, preferably balls, run in raceway grooves of the bearing cones. At one end, the balls run also in a raceway groove of a bearing cup 42 which fits in the brake housing 20, the cup having an integral flange 44 to abut against the end of the brake housing. The cup is preferably pushed into the housing and brazed thereto. At the other end, the balls 40 run in a raceway groove of a bearing cup or driving member 46 which is externally grooved to receive balls 48 which run in a raceway groove of the brake housing. The driving member 46 has a flange 50 projecting across the end of the brake housing, an angular dust washer 52 lapping across the joint. The hub of a sprocket wheel 54 is threaded on the driving member 46 against one leg of the dust washer 52 and is locked by a lock nut 56. Each bearing cone 36 carries a dust washer 58 which is pressed into a groove adjacent to a terminal flange which is externally polygonal to receive a wrench.

The pedal shaft 30 has steep threads 60 mating with threads in a shiftable nut 62 having an externally tapered clutch surface 64 adapted to have driving contact with a similar surface at the interior of the driving member 46. The nut has a radial kerf 66 at one end to receive a radial lug 68 on an arcuate lag spring or retarder 70. The retarder is arched in cross section and frictionally engages a rounded groove in the driving member 46. When the pedals are actuated to propel the bicycle forwardly, the retarding spring 70 resists the turning of the nut with the pedal shaft thereby causing the nut to shift into driving engagement with the driving member. Of course the sprocket wheel 54 will have the usual sprocket chain or other suitable connection with the rear wheel of the bicycle to drive it. When the pedals are held stationary to coast or are rotated backwardly, the nut 62 will shift out of its frictional driving connection with the driving member 46.

Near the other end of the housing, a second shiftable nut 72 has threaded engagement with the threads 60. The nut has a little projection 74 to abut against the adjacent race ring 36 to limit shifting in one direction. The nut has a radial kerf 76 to receive a radially and laterally projecting lug 78 on an arcuate lag spring or retarder 80 which frictionally engages a rounded groove in an extension 81 of the bearing cup 42. When the bicycle is being propelled forwardly, the nut 72 and the spring 80 turn with the shaft 30, the only resistance being the friction of the spring in its groove. The nut 72 has laterally facing clutch teeth 82 adapted to engage cooperating teeth on a clutch ring 84 which is provided with radial lugs or keys entering keyways 86 in the housing 20. Outer brake discs 88 are similarly keyed to the housing and alternate with inner brake discs 90 having radial lugs or keys entering keyways 92 in a brake sleeve 94. The outer brake discs are thus always anchored against rotation but clear the sleeve 94 which can turn with respect to them; the inner brake discs are free to turn with respect to the brake housing 20 but when the inner and the outer discs are squeezed together laterally, they resist turning of the sleeve 94 with respect to the brake housing and the hanger 10. The sleeve 94 may be directly connected to the driving member 46 but this would result in turning of the inner brake discs 90 with the driving member 46 both when coasting and driving, thereby creating some drag effect by light rubbing contact with the outer anchored discs 88. Accordingly, the sleeve 94 is made separable from the driving member 46 so that all brake discs are stationary when coasting or driving but such sleeve can be clutched to the driving member when braking. The sleeve has a clutch collar 96 provided with clutch teeth 98 adapted to engage similar teeth on the member 46. A coil spring 100 is interposed between a shoulder of the collar 96 and a snap ring 102 which is inserted in a groove of the housing. The spring tends to keep the clutch collar disengaged and to press the brake disc assembly towards the abutment provided by the extension 81.

In operation, in forward driving, the nut 62 shifts into driving engagement with the driving member 46 whereupon the pedal shaft, nut and driving member turn as a unit. When coasting, the nut shifts away from the driving member 46 which turns freely and alone. When the pedal shaft is turned backwardly to apply the brake, the brake actuating nut 72 shifts to the right to come into clutching engagement with the clutch ring 84 and to force that clutch ring and the brake disc assembly to the right until the clutch collar 96 engages the driving member. Thereupon resistance to the turning of the brake sleeve 94 and the driving member 46 (which are then being driven by the sprocket wheel and its connection with the rear wheel) is effected by reaction between the inner or rotating brake discs 90 and the anchored brake discs 88.

Figure 6:
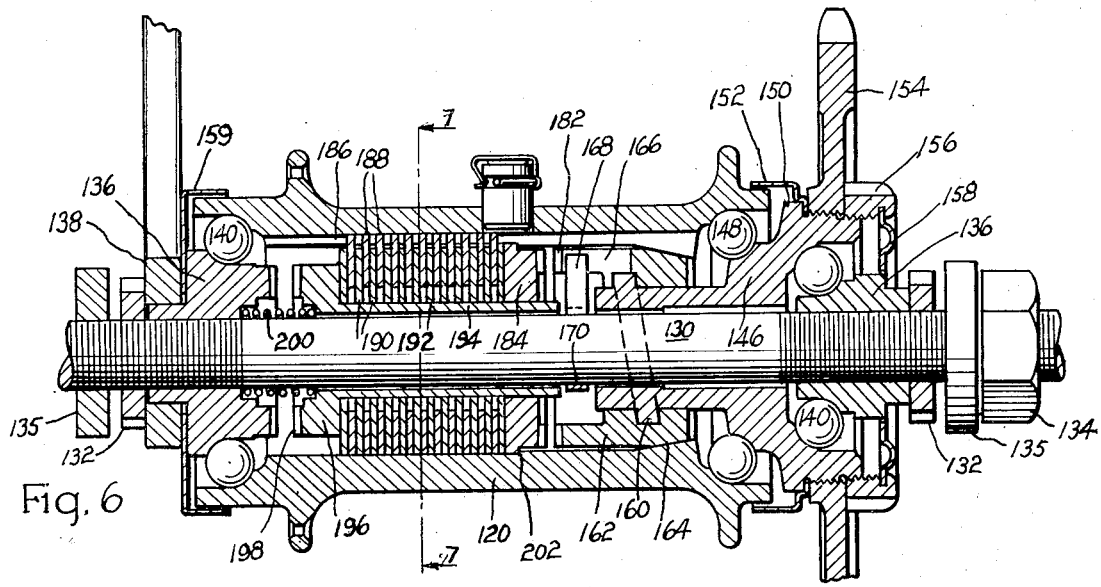
Fig. 6 is a view similar to Fig. 1 of a modification.
Figure 7:
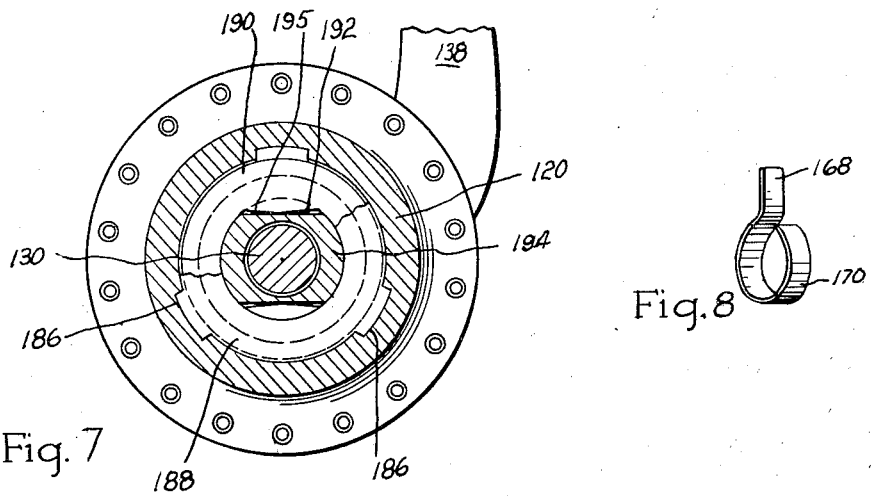
Fig. 7 is a section on line 7—7 of Fig. 6.
Figure 8:
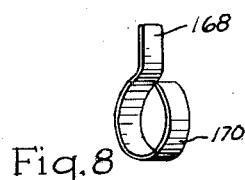
Fig. 8 is a perspective view of a lag spring.

In Figs. 6, 7 and 8, similar principles are applied to a coaster brake housed in a rear wheel hub or housing 120, parts analogous to those in Figs. 1 to 5 being designated by numerals one hundred higher. A shaft 130 is adapted to be clamped to the rear forks (not shown) of a bicycle by inner nuts 132 and outer nuts 134, a washer 135 being interposed between each outer nut 134 and the adjacent fork. Inner adjustable race rings or cones 136 are threaded on the shaft and locked by the nuts 132, one of the cones having a polygonal extension fitting a similarly shaped hole in a brake anchoring arm 138. Rolling elements 140 in the form of balls run in raceway grooves of the cones, one row of balls engaging a raceway groove in the hub or housing 120, the other row engaging a raceway groove in a driving member 146. The driving member has an external raceway groove for rolling elements 148 which also run in a raceway groove of the hub or housing. A flange 150 supports a dust shield 152 which closes the space between the driving member 146 and the hub. A sprocket wheel 154 is threaded on the driving member and clamped against the shield by a lock nut 156. To close the space between the driving member and the adjacent cam 136, a dust washer 158 is expanded in a groove of the nut 156 and has running clearance with the cone. The other end of the hub is guarded by a dust shield 159 clamped to the cone.

To effect driving, a coarse thread 160 on the driving member 146 engages threads on a shiftable nut 162 which is externally provided with a tapered clutch surface 164 adapted to engage a corresponding clutch surface on the hub. The nut has a radial kerf 166 to receive a radial lug 168 on an arcuate lag spring or retarder 170 which frictionally engages the shaft 130. In forward driving, the spring retards rotation of the nut so that the nut shifts axially to engage the clutch surfaces at 164. In coasting, the forward rotation of the hub and the accompanying initial rotation of the nut shifts the nut out of driving relation to the hub.

When braking, the nut 162 and its lag spring 170 function similarly to the nut 72 and lag spring 78 of Fig. 1. The nut 162 has lateral clutch teeth 182 adapted to engage similar teeth on a clutch ring 184 which is adapted to be shifted axially with, and with respect to, two sets of brake discs. The outer discs 188 have radial lugs or keys entering keyways 186 in the hub or housing while the inner brake discs 190 and the clutch ring 184 are held from rotation with respect to a brake sleeve 194 which surrounds the shaft 130. The keyway of the inner brake discs may be effected with radial keys as in Fig. 1 but it is preferable to flatten the top and bottom surfaces of the brake sleeve as at 192 and provide the inner discs with a somewhat similar shape internally but with the additional feature of cutting back the flat edges from the vertical center line as indicated at 195 in Fig. 7. This is to avoid burring of the thin edges of the discs and the effect is produced because, when the discs rotate slightly in braking by reason of necessary assembly clearance with the brake sleeve, the cut-back edges 195 engage along their whole length with the sleeve instead of making impact at a point.

The brake sleeve has a collar 196 at the end opposite to the clutch ring 184 so that the brake discs can be squeezed between these members. The collar 196 has clutch teeth 198 adapted to engage similar teeth on the anchored cone 136. A coil spring 200 interposed between the cone 136 and the collar 196 of sleeve 194 tends to unclutch such members, a stop shoulder 202 in the hub engaging a little flange on the clutch ring 184 to limit floating movement of the brake assembly away from the spring.

When driving the bicycle forwardly, rotation of the driving member 146 causes the nut 162 to shift axially when the latter is retarded by the lag spring 170. Thus the clutch surfaces 164 engage and drive the hub. In coasting, the forward rotation of the hub and the accompanying initial rotation of the nut with respect to the driving member 146 shifts the nut to disengage the clutch surfaces 164. When the member 146 is turned backwardly to apply the brake, the rotation of the nut 162 is retarded by the lag spring 170 so that the nut shifts to the left to engage its clutch teeth 182 with those of the clutch ring 184. Continued movement shifts the entire brake assembly to the left to bring the collar 196 into clutching engagement with the anchored cone 136. Thereafter the outer and inner brake discs become pressed together to brake the hub. When the braking pressure is released, the coil spring shifts the brake assembly back to the coasting and driving position wherein the brake assembly rotates with the hub. There is however no relative rotation of the brake discs and accordingly no drag effect to retard the hub when coasting.

I claim:

1. In a device of the character described, a shaft and a housing mounted for relative rotation, a rotatable sleeve between the shaft and the housing and contained within the housing in clearance relation to the shaft, co-operating relatively rotatable brake members between the housing and the rotatable sleeve and supporting said sleeve from the housing, and means for bringing said brake members into frictional engagement; substantially as described.

2. In a device of the character described, a shaft and a housing mounted for relative rotation, a rotatable sleeve between the shaft and the housing, the shaft and the sleeve being clear of contact with one another for unlimited relative rotation, brake discs keyed to the rotatable sleeve and alternating with brake discs keyed to the housing, a shiftable nut, and means for shifting said nut to cause said brake discs to frictionally engage one another; substantially as described.

3. In a device of the character described, a shaft and a housing mounted for relative rotation, a rotatable sleeve between the shaft and the housing, the sleeve being contained within the housing in clearance relation to the shaft to provide for unlimited relative rotation between sleeve and shaft, friction members between the housing and the rotatable sleeve, a ring shiftable in the housing to cause said friction members to have braking engagement, a shiftable nut, and means for shifting the nut into engagement with said ring; substantially as described.

4. In a device of the character described, a shaft and a housing mounted for relative rotation, a rotatable sleeve between the shaft and the housing and in clearance relation to the shaft, friction members between the housing and the rotatable sleeve, an abutment on the sleeve, a clutch ring shiftable in the housing and opposing the sleeve abutment, a nut adapted to have clutching engagement with the ring, and means for shifting the nut; substantially as described.

5. In a device of the character described, a rotatable member which rotates when driving and coasting, a driving member adapted for driving connection with the rotated member when driving and for disengagement therefrom when coasting, co-operating relatively rotatable brake members for frictionally engaging one another and resisting rotation of the rotatable member when braking, and means for causing said co-operating brake members to have no relative rotation during coasting and driving; substantially as described.

6. In a device of the character described, a rotatable member which rotates when driving and coasting, a driving member adapted for driving connection with the rotatable member when driving and for disengagement therefrom when coasting, co-operating relatively rotatable brake members for frictionally engaging one another and resisting rotation of the rotatable member when braking, a shiftable brake carrying sleeve, and means for shifting said sleeve in two directions to cause said brake members to have relatively rotatable braking engagement or to free them from relative rotation when coasting; substantially as described.

7. In a device of the character described, a rotatable member which rotates when driving and coasting, a driving member adapted for driving connection with the rotatable member when driving and for disengagement therefrom when coasting, a rotatable sleeve, brake discs keyed to the sleeve and brake discs keyed to the housing, said discs being relatively rotatable and frictionally engaging one another when braking, and means for shifting said sleeve in two directions to cause said brake members to have relatively rotatable braking engagement, or to free them from relative rotation when coasting or driving; substantially as described.

8. In a device of the character described, a shaft and a housing mounted for relative rotation, a floating sleeve between the shaft and the housing and shiftable endwise in the housing, friction discs between the sleeve and the housing, the sleeve having a clutch member, a co-operating clutch member, and means for squeezing the friction discs together and shifting the sleeve endwise to thereafter bring said clutch members into engagement to procure a braking action between the sleeve and the housing; substantially as described.

9. In a device of the character described, a shaft and a housing mounted for relative rotation, a floating sleeve between the shaft and the housing, brake discs keyed to the sleeve and alternating with brake discs keyed to the housing, the sleeve having a collar at one end providing a clutch member and an abutment for the discs, a co-operating clutch member, and means for squeezing the brake discs towards the collar and thereby shifting the floating sleeve endwise to bring said clutch members into engagement to transmit braking action between the sleeve and the housing; substantially as described.

10. In a device of the character described, a shaft and a housing mounted for relative rotation, a floating sleeve between the shaft and the housing, the sleeve having a clutch member at one end, a co-operating clutch member between which and the housing there is relative rotation, friction members between the housing and the sleeve and supporting the sleeve clear of the shaft for endwise movement, and means for causing the sleeve to shift endwise to have clutching engagement with said co-operating clutch member to cause the friction members to interpose frictional resistance to relative rotation between the sleeve and the housing; substantially as described.

11. In a device of the character described, a shaft and a housing mounted for relative rotation, a floating sleeve between the shaft and the housing, the sleeve having a clutch collar, a co-operating clutch member between which and the housing there is relative rotation, a ring opposed to the clutch collar, friction members between the sleeve and the housing and between the collar and the ring, and means for shifting said ring towards the clutch collar and for moving said clutch collar into engagement with its co-operating clutch member; substantially as described.

12. In a device of the character described, a shaft and a housing mounted for relative rotation, a floating sleeve between the shaft and the housing, the sleeve having a clutch member, a co-operating clutch member, a spring normally holding said clutch members out of engagement, friction members between the sleeve and the housing, and means for shifting the sleeve into clutching engagement with said co-operating clutch member and thereby making said friction members effective to resist relative rotation of the sleeve and the housing; substantially as described.

13. In a device of the character described, a shaft and a housing mounted for relative rotation, a floating sleeve between the shaft and the housing, the sleeve having a clutch member, a co-operating clutch member, friction members between the sleeve and the housing, a spring engaging the sleeve for urging the clutch members apart and the friction members together, and means for shifting the sleeve into clutching engagement with its co-operating clutch member; substantially as described.

14. In a device of the character described, a shaft and a housing mounted for relative rotation, a floating sleeve between the shaft and the housing, the sleeve having a clutch member, a co-operating clutch member between which and the housing there is relative rotation, friction members between the sleeve and the housing, a nut shiftable towards said sleeve and the friction members, and a relatively rotatable threaded member for shifting said nut; substantially as described.

15. In a device of the character described, a shaft and a housing mounted for relative rotation, a floating sleeve between the shaft and the housing, the sleeve having a clutch collar, a co-operating clutch member between which and the housing there is relative rotation, a ring opposed to the clutch collar, friction members between the collar and the ring, and a nut shiftable into engagement with the ring to squeeze said friction members together and to shift the sleeve into engagement with its co-operating clutch member; substantially as described.

16. In a device of the character described, a shaft and a housing mounted for relative rotation, a floating sleeve between the shaft and the housing, the sleeve having a clutch member, a co-operating clutch member, friction members between the sleeve and the housing, a nut shiftable towards said sleeve to make effective said friction members and said clutch members, and a rotatable driving member having threaded connection with the nut to shift the latter; substantially as described.

17. In a device of the character described, a non-rotary housing, a rotatable member, a rotary drive shaft adapted for driving connection with the rotatable member when driving and for disengagement therefrom when the rotatable member is coasting, co-operating relatively rotatable brake members for frictionally engaging one another and resisting turning of the rotatable member with respect to the housing when braking, and means for causing said co-operating brake members to have no rotary movement during coasting and driving; substantially as described.

18. In a device of the character described, a rotary housing, a driving member adapted for driving connection with the housing when driving and for disengagement therefrom when coasting, co-operating relatively rotatable brake members for frictionally resisting movement of the housing when braking, and means for causing said brake members to rotate as a unit with the housing during coasting and driving; substantially as described.

19. In a device of the character described, a rotary housing, a driving member adapted for driving connection with the housing when driving and for disengagement therefrom when coasting, a sleeve freely rotatable when coasting or driving, brake discs keyed to the housing and brake discs keyed to the sleeve, and means for preventing rotation of the sleeve to cause said brake discs to have frictional braking engagement; substantially as described.

20. In a device of the character described, a crank hanger having an opening, a housing adapted to slip into said opening, means for detachably securing the housing in the opening, bearings in the housing, and pedal-operated coaster brake mechanism comprising a rotatable shaft and an independently and freely rotatable driving member supported by the bearings in said housing and detachable as a unit with the housing and the bearings; substantially as described.

21. In a device of the character described, a crank hanger having an opening, a housing adapted to slip into said opening, coaster brake mechanism carried in said housing, and means engaging the housing and extending through the hanger for interlocking said parts against relative rotation; substantially as described.

22. In a device of the character described, a crank hanger having an opening, a housing adapted to slip into said opening, coaster brake mechanism carried in said housing, means engaging the housing and the hanger for interlocking said parts against rotation, and said engaging means also having means to lubricate the brake mechanism; substantially as described.

23. In a device of the character described, a housing, a shaft journalled to rotate in the housing, a rotatable sleeve between the shaft and the housing and mounted for rotation with respect to both of said members, brake mechanism between the housing and the rotatable sleeve, an abutment on the sleeve, a ring keyed to the housing to slide endwise therein and opposing the sleeve abutment, and means for causing the ring and the sleeve abutment to have relative movement of approach to brake said sleeve with respect to the housing; substantially as described.

24. In a device of the character described, a housing, a shaft journalled to rotate in the housing, a rotatable sleeve between the shaft and the housing, brake mechanism between the housing and the sleeve, a ring keyed to the housing and shiftable to make said brake mechanism effective, a nut threaded on the shaft, and means for shifting the nut against the ring; substantially as described.

25. In a device of the character described, a housing, a shaft journalled to rotate in the housing, a rotatable sleeve between the shaft and the housing, brake mechanism between the housing and the sleeve, an abutment on the sleeve, a clutch ring shiftable in the housing and opposing the sleeve abutment, a nut adapted to have clutching engagement with the ring, and means for shifting the nut into or out of engagement with the ring; substantially as described.

26. In a device of the character described, a shaft and a housing mounted for relative rotation, a rotatable sleeve between the shaft and the housing and mounted for unlimited rotation with respect to both of said members, friction members comprising a series of keyed washers reacting between the housing and the rotatable sleeve, a nut having threaded connection with the shaft, and means for turning said shaft to shift the nut and bring said friction members into rubbing engagement; substantially as described.

EDWARD W. GLACY.